(12) United States Patent
Geens et al.

(10) Patent No.: US 12,050,355 B2
(45) Date of Patent: Jul. 30, 2024

(54) CABLE SEALING UNIT WITH CABLE SEALING MODULES

(71) Applicant: COMMSCOPE CONNECTIVITY BELGIUM BVBA, Kessel-Lo (BE)

(72) Inventors: Johan Geens, Bunsbeek (BE); Bart Vos, Geel (BE); Kristof Vastmans, Kessel-Lo (BE)

(73) Assignee: COMMSCOPE CONNECTIVITY BELGIUM BVBA, Kessel-Lo (BE)

( * ) Notice: Subject to any disclaimer, the term of this patent is extended or adjusted under 35 U.S.C. 154(b) by 0 days.

(21) Appl. No.: 17/225,759

(22) Filed: Apr. 8, 2021

(65) Prior Publication Data

US 2021/0255409 A1 Aug. 19, 2021

Related U.S. Application Data

(63) Continuation of application No. 16/489,995, filed as application No. PCT/EP2018/055036 on Mar. 1, 2018, now Pat. No. 11,002,929.

(60) Provisional application No. 62/465,599, filed on Mar. 1, 2017.

(51) Int. Cl.
*G02B 6/44* (2006.01)
*H02G 15/013* (2006.01)

(52) U.S. Cl.
CPC ......... *G02B 6/4444* (2013.01); *H02G 15/013* (2013.01)

(58) Field of Classification Search
CPC ............................ G02B 6/4446; H02G 15/013
See application file for complete search history.

(56) References Cited

U.S. PATENT DOCUMENTS

| | | |
|---|---|---|
| 5,059,748 A | 10/1991 | Allen et al. |
| 5,192,832 A | 3/1993 | Rudy, Jr. et al. |
| 5,775,702 A | 7/1998 | Laeremans |
| 6,046,406 A | 4/2000 | Milanowski et al. |
| 6,118,076 A | 9/2000 | Damm et al. |
| 6,184,470 B1 | 2/2001 | Froehlich et al. |
| 9,395,506 B2 | 7/2016 | Simmons |
| 2011/0070078 A1 | 3/2011 | Paprotna et al. |
| 2011/0080078 A1* | 4/2011 | Perschon ................. H02B 1/50 248/68.1 |
| 2012/0200978 A1 | 8/2012 | Miller et al. |

(Continued)

FOREIGN PATENT DOCUMENTS

| | | |
|---|---|---|
| EP | 0 442 941 B1 | 1/1995 |
| EP | 0 587 616 B1 | 7/1996 |

(Continued)

OTHER PUBLICATIONS

Communication dated Nov. 11, 2021 in corresponding European Application No. 18 709 317.4, 5 pages.

(Continued)

*Primary Examiner* — Eric Wong
(74) *Attorney, Agent, or Firm* — Merchant & Gould P.C.

(57) ABSTRACT

One aspect of the present disclosure relates to an enclosure system including enclosures of different sizes, shapes and styles that are all compatible with gel sealing modules having a given module form factor or a multiple of the given module form factor. In this way, gel sealing modules having one form factor and/or multiples thereof can be universally used across an entire product line of enclosures.

6 Claims, 13 Drawing Sheets

(56) References Cited

U.S. PATENT DOCUMENTS

| | | |
|---|---|---|
| 2013/0294739 A1 | 11/2013 | Allen |
| 2015/0168664 A1* | 6/2015 | Coenegracht ........ G02B 6/4444 385/135 |
| 2015/0345668 A1 | 12/2015 | Blaser et al. |
| 2016/0204592 A1 | 7/2016 | Coenegracht et al. |
| 2016/0216470 A1* | 7/2016 | Michiels .............. G02B 6/4444 |
| 2017/0045701 A1 | 2/2017 | Diepstraten et al. |
| 2019/0170961 A1* | 6/2019 | Coenegracht ........ G02B 6/4444 |
| 2019/0219785 A1 | 7/2019 | Radelet et al. |
| 2019/0326739 A1 | 10/2019 | Nowastowski-Stock |

FOREIGN PATENT DOCUMENTS

| | | |
|---|---|---|
| WO | 2014/005916 A2 | 1/2014 |
| WO | 2014/005918 A2 | 1/2014 |

OTHER PUBLICATIONS

International Search Report and Written Opinion of the International Searching Authority for International Patent Application No. PCT/EP2018/055036 dated May 28, 2018, 17 pages.

Multi-cable Sealing Kits for FOSC 450 and FOSC Closures, CommScope Inc., 2016, 2 pages.

\* cited by examiner

CABLE SEALING UNIT WITH CABLE SEALING MODULES

CROSS-REFERENCE TO RELATED APPLICATION

This application is a Continuation of U.S. patent application Ser. No. 16/489,995, filed on Aug. 29, 2019, now U.S. Pat. No. 11,002,929, which is a National Stage Application of PCT/EP2018/055036, filed on Mar. 1, 2018, which claims the benefit of U.S. patent application Ser. No. 62/465,599, filed on Mar. 1, 2017, the disclosures of which are incorporated herein by reference in their entireties. To the extent appropriate, a claim of priority is made to each of the above disclosed applications.

TECHNICAL FIELD

The present disclosure relates generally to techniques for sealing cable entry points of enclosures within telecommunications systems.

BACKGROUND

Pressurized gel-type seals have been used to effectively seal the locations where telecommunications cables enter and exit telecommunications enclosures. Example pressurized gel-type seals are disclosed by document EP 0442941 B1 and document EP 0587616 B1. Both of these documents disclose gel-type cable seals that are pressurized through the use of threaded actuators. Document U.S. Pat. No. 6,046, 406 discloses a cable seal that is pressurized through the use of an actuator including a cam lever. PCT International Publication Number WO 2014/005916 discloses can cable sealing unit having a plurality of removable cable sealing modules including sealing gel. While pressurized cable seals have generally proven to be effective, improvements in this area are still needed, particularly in the area of modularity and design efficiency and flexibility across different products of a product line.

SUMMARY

One aspect of the present disclosure relates to an enclosure system including enclosures of different sizes, shapes and styles that are all compatible with gel sealing modules having a given module form factor or a multiple of the given module form factor. In this way, gel sealing modules having one form factor and/or multiples thereof can be universally used across an entire product line of enclosures. In certain examples, sealing units for all of the different enclosures can include module pockets having a standard or universal pocket form factor or a multiple thereof compatible with the form factor or multiples thereof of the gel sealing modules. In one example, both the module pockets and the gel sealing modules are rectangular. This promotes manufacturing efficiency and flexibility and also facilitates the design and implementation of new enclosure sizes and types within the product line without requiring the development and testing of new gel sealing modules. When a sealing unit for a new enclosure is designed, the sealing unit is provided with module pockets having the standard pocket form factor or multiple thereof that are/is compatible with the module form factor and multiple thereof.

Another aspect of the present disclosure relates to a sealing unit for use with an enclosure such as a telecommunications enclosure (e.g., a housing containing optical components such as passive optical power splitters, wavelength division multiplexers, fiber optic adapters, patch panels, fusion or mechanical splices, fiber management trays such as splice trays or splitter trays, etc.). The sealing unit includes a sealing unit frame, and a plurality of gel sealing modules that are held by the frame. The gel sealing modules are all rectangular and at least one defines at least one cable port for receiving and sealing a cable such as a fiber optic cable. The use of only rectangular gel sealing modules facilitates modularity and providing one form factor and/or multiples thereof that are compatible with sealing unit frames for use with various shapes, sizes and styles of enclosures. Other form factors (e.g. trapezoidal, parallelogram, etc.) could be used as well, but rectangular is preferred.

A further aspect of the present disclosure relates to a sealing unit for use with a telecommunications enclosure. The sealing unit includes a sealing unit frame including divider walls that define separate module mounting pockets. The sealing unit also includes gel sealing modules that mount within the module mounting pockets. At least one of the gel sealing modules can include one or cable ports that pass through the gel of the gel sealing module. The divider walls prevent the gel sealing modules in different pockets of the sealing unit frame from contacting each other.

A further aspect of the present disclosure relates to a sealing unit for use with a telecommunications enclosure. The sealing unit includes a sealing unit frame which defines separate module pressurization chambers. The sealing unit also includes gel sealing modules (e.g., at least one cable sealing modules having gel defining a cable port or capable of defining a cable port). The sealing unit further includes an actuator (e.g., a single actuator) that simultaneously pressurizes the gel sealing modules in all of the separate module pressurization chambers. By providing separate module pressurization chambers, the volumes of the chambers can be precisely controlled and matched to the gel sealing modules. Additionally, the use of separate module pressurization chambers can allow for a minimization of the total amount of gel used (e.g., by strategically placing the gel where needed for cable sealing and not elsewhere) and facilitates the use of gel sealing modules having a set form factor across numerous enclosures of a give product line. The use of separate module pressurization chambers facilitates designing sealing units that are compatible with different size and styles of enclosures because the gel sealing modules are not required to conform to the shape of the enclosure (e.g., the gel sealing modules themselves are not required to seal between each other and are not required to form a perimeter seal with the enclosure). Instead, the focus can be on cable sealing within a given pocket.

A variety of additional inventive aspects will be set forth in the description that follows. The inventive aspects can relate to individual features and to combinations of features. It is to be understood that both the foregoing general description and the following detailed description are exemplary and explanatory only and are not restrictive of the broad inventions and inventive concepts upon which the embodiments disclosed herein are based.

DETAILED DESCRIPTION

Figure 1:
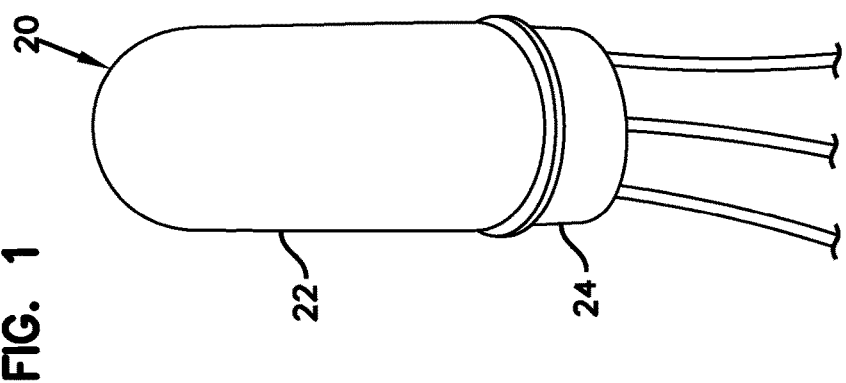
FIG. 1 shows a first enclosure that is an example of a type of enclosure in which a sealing unit in accordance with the principles of the present disclosure can be used.

FIG. 1 shows an example enclosure 20 that is one example of a type of enclosure in which sealing units in accordance with the principles of the present disclosure can be used. The enclosure includes a cover 22 that mounts on a base 24. The base 24 is adapted for receiving a sealing unit that allows cables to enter the enclosure 20 in a sealed manner. A gasket or other seal can be used between the cover 22 and the base 24. In certain examples, a clamp such as a band clamp can be used to join the cover 22 to the base 24. As depicted, the base 24 is generally circular. As depicted, the cover 22 has a closed end opposite from an open end. The cover 22 can be referred to as a dome.

Figure 2:
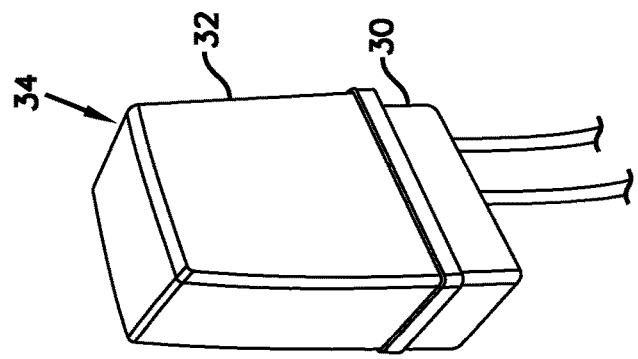
FIG. 2 illustrates a second enclosure that is an example of a type of enclosure in which a sealing unit in accordance with the principles of the present disclosure can be used.

FIG. 2 illustrates another enclosure 30 that is an example of an enclosure suitable for use with sealing units in accordance with the principles of the present disclosure. The enclosure 30 includes a cover 32 and a base 34. The base 34 is adapted for receiving a sealing unit such as a sealing unit in accordance with the principles of the present disclosure. The base 34 is generally rectangular. A seal can be provided between the cover 32 and the base 34. The cover 32 and the base 34 can be clamped together or otherwise fastened together. With a sealing unit mounted within the base 34, cables can be routed in a sealed manner to the interior of the enclosure 30. The cover 32 is depicted including a closed end positioned opposite from an open end. The open end attaches to the base 34. The cover 32 can be referred to as a dome.

Figure 3:
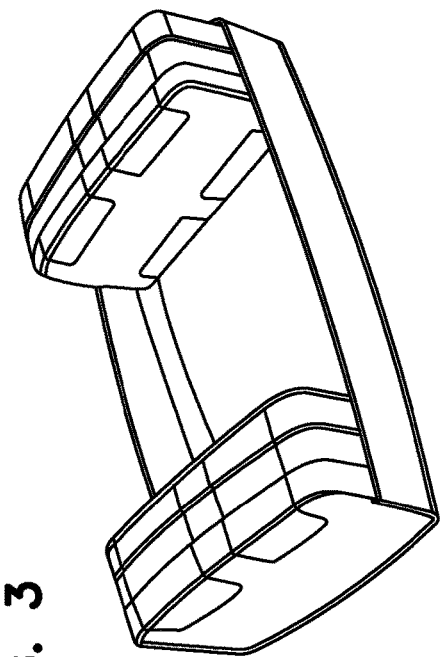
FIG. 3 depicts a third enclosure that is an example of a type of enclosure in which a sealing unit in accordance with the principles of the present disclosure can be used.

FIG. 3 illustrates a further enclosure 40 that is an example of an enclosure suitable for use with sealing units in accordance with the principles of the present disclosure. It will be appreciated that the enclosures 20, 30 have a butt-style configuration in which cables are routed in and out one end of each enclosure. In contrast, the enclosure 40 has an in-line configuration in which cable sealing units can be mounted at both ends of the enclosure and cables can be routed onto the enclosure at one end and out of the enclosure at the opposite end. In certain examples, cable sealing units can be mounted between opposing pieces of the enclosure that are mated together.

Figure 4:
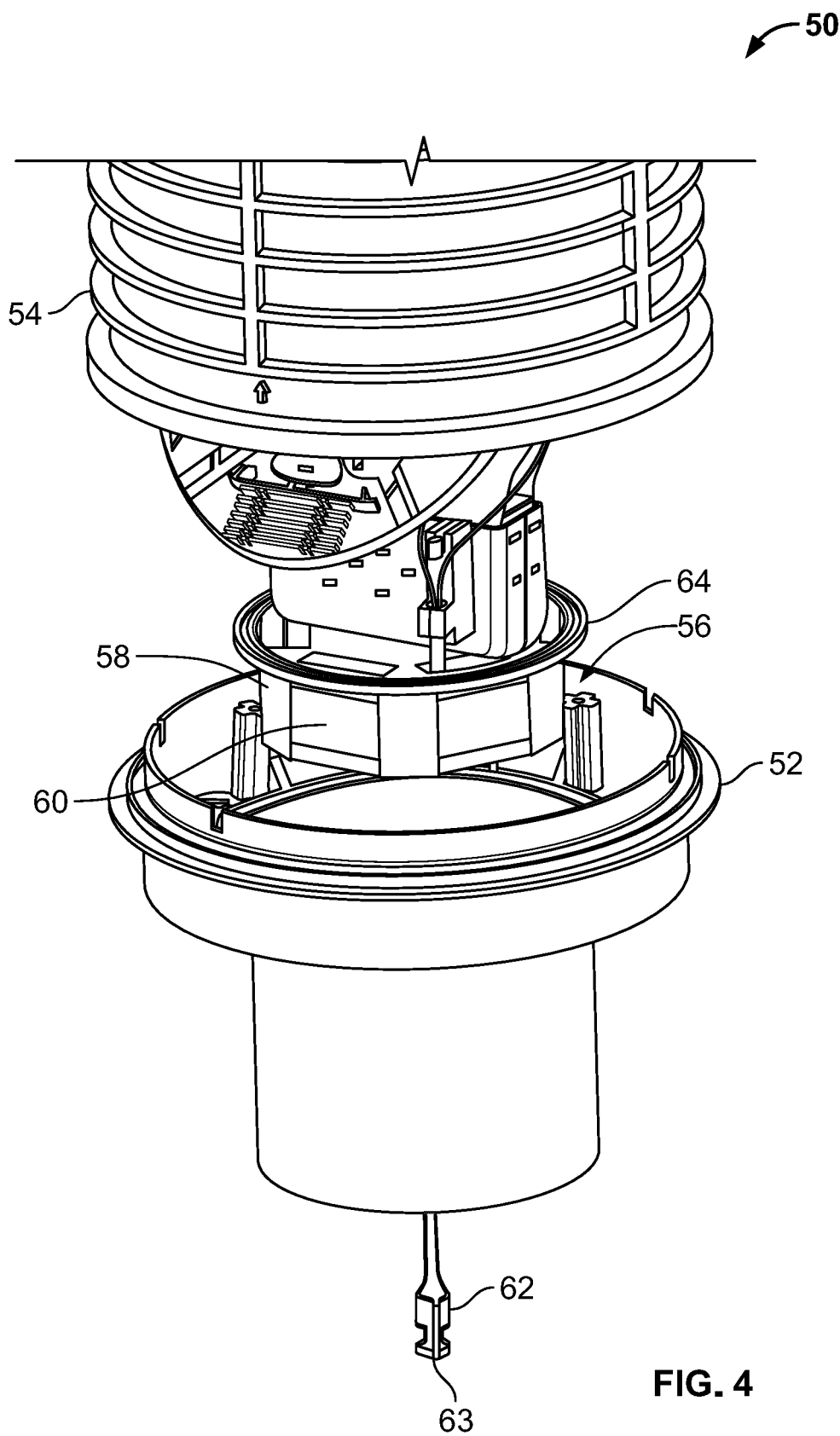
FIG. 4 is a perspective view of a sealing unit in accordance with the principles of the present disclosure shown aligned with a corresponding enclosure base configured to receive the sealing unit.

FIG. 4 shows an enclosure 50 in accordance with the principles of the present disclosure. Enclosure 50 includes a base 52 and a cover 54. The enclosure 50 also includes a cable sealing unit 56 that mounts in the base 52. The cable sealing unit 56 includes a sealing unit frame 58 and a plurality of gel sealing modules 60 that are removeably held by the sealing unit frame 58. The sealing unit 56 also includes an actuator 62 that interfaces with the sealing unit frame 58 to selectively pressurize the gel sealing modules 60. The cable sealing unit 56 further includes a perimeter seal 64 adapted to form a seal between an exterior of the sealing unit frame 58 and an interior of the base 52.

In certain examples, the actuator 62 can include a threaded interface that pressurizes the gel sealing modules 60 when a handle 63 of the actuator is turned. In other examples, other types of actuators such as lever arms and cam arrangements can be used. Example actuators for use with sealing units are disclosed by PCT International Publication No. WO 2014/005916, which is hereby incorporated by reference in its entirety.

In certain examples, the perimeter seal 64 can include a continuous sealing member carried with the sealing unit frame 58. In certain examples, the perimeter sealing 64 can be mounted within a groove or other structure provided by the sealing unit frame 58. In certain examples, perimeter seal 64 can include a gasket such as an O-ring or an elastomeric sealing member having a shaped transverse cross-sectional profile. In certain examples, the perimeter seal 64 can be molded onto the exterior of the sealing unit frame 58. In certain examples, the perimeter seal 64 can define one or more grooves. In certain examples, the perimeter seal 64 can have a flat configuration. In certain examples, the perimeter seal 64 can have an elastomeric construction such as rubber or synthetic rubber. In certain examples, the perimeter seal 64 is not contiguous with the gel of the gel sealing modules 60. In certain examples, perimeter seal 64 is a separate component from the gel sealing modules 60.

Figure 5:
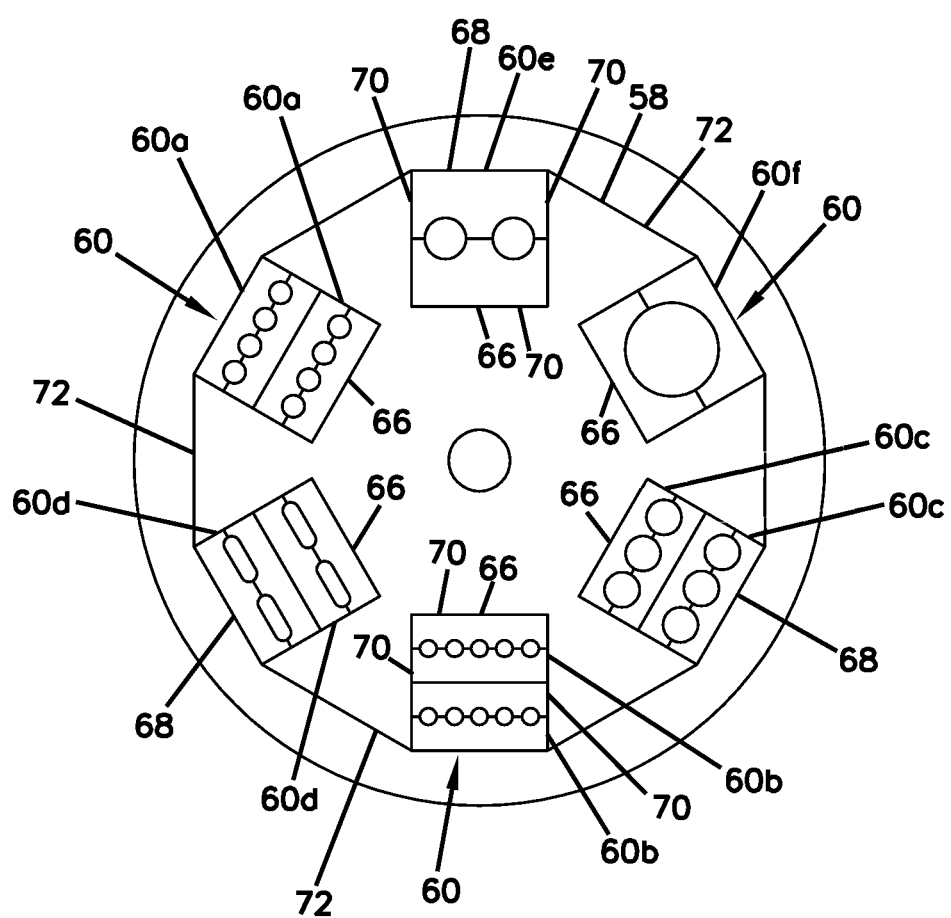
FIG. 5 is a schematic end view showing the sealing unit of FIG. 4 mounted within its corresponding enclosure base.
Figure 7:
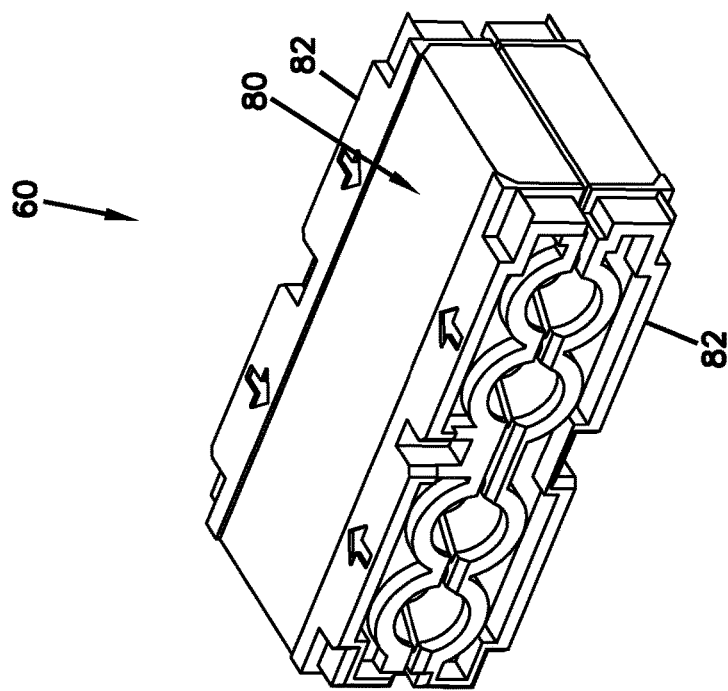
FIG. 7 depicts an example four-port cable sealing module adapted for use with cable sealing units in accordance with the principles of the present disclosure.
Figure 6:
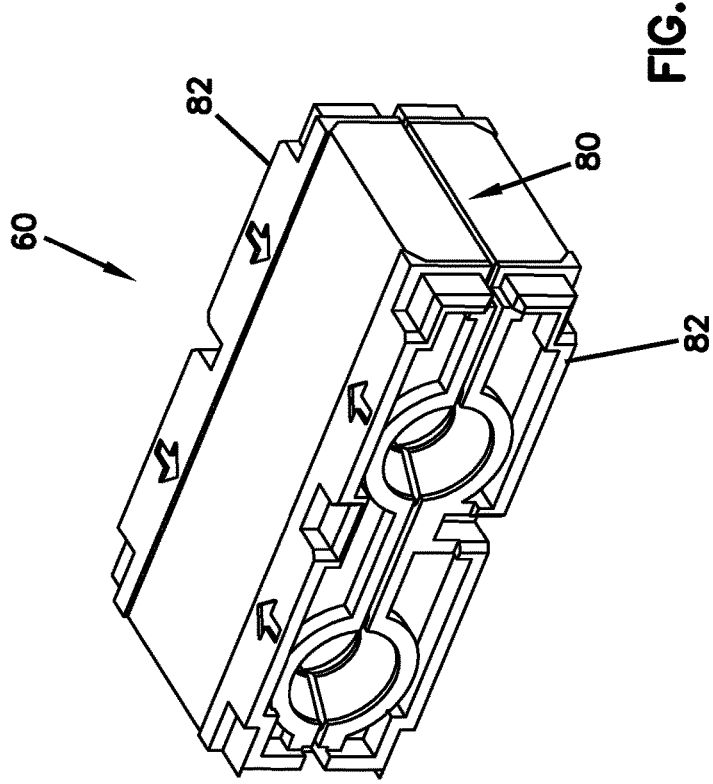
FIG. 6 is a perspective view of an example two-port cable sealing module suitable for use with sealing units in accordance with the principles of the present disclosure.
Figure 8:
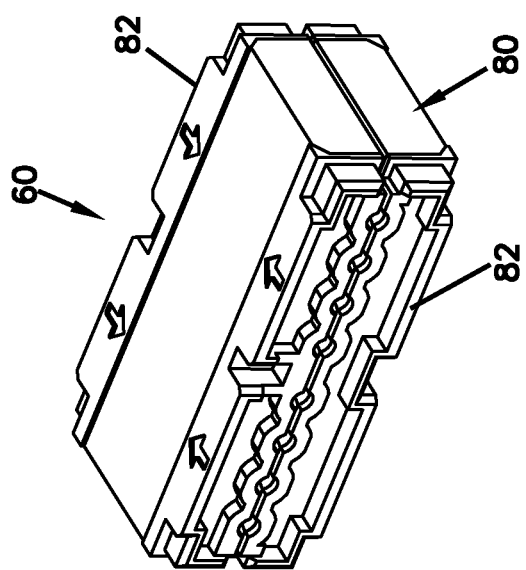
FIG. 8 depicts an example eight-port cable sealing module adapted for use with cable sealing units in accordance with the principles of the present disclosure.
Figure 10:
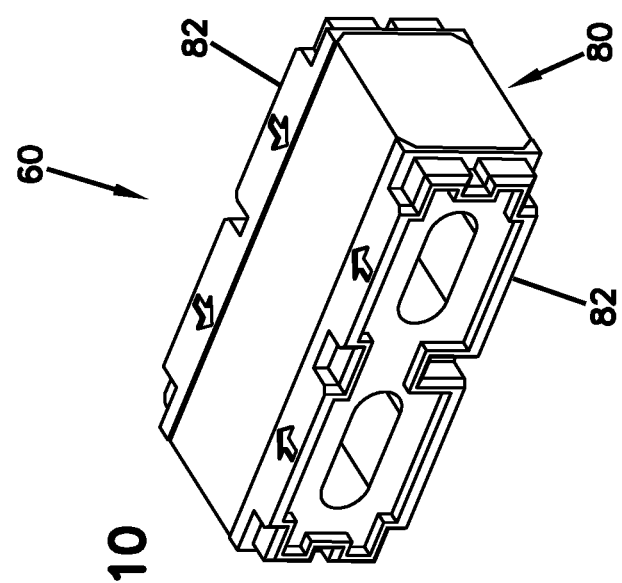
FIG. 10 illustrates an example cable sealing module adapted for sealing units in accordance with the principles of the present disclosure, the cable sealing module defines two elongate cable ports adapted for receiving flat drop cables.
Figure 9:
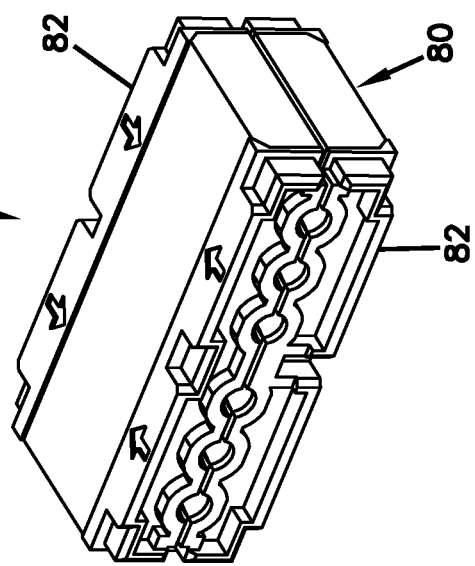
FIG. 9 depicts an example six-port cable sealing module adapted for use with cable sealing units in accordance with the principles of the present disclosure.
Figure 11:
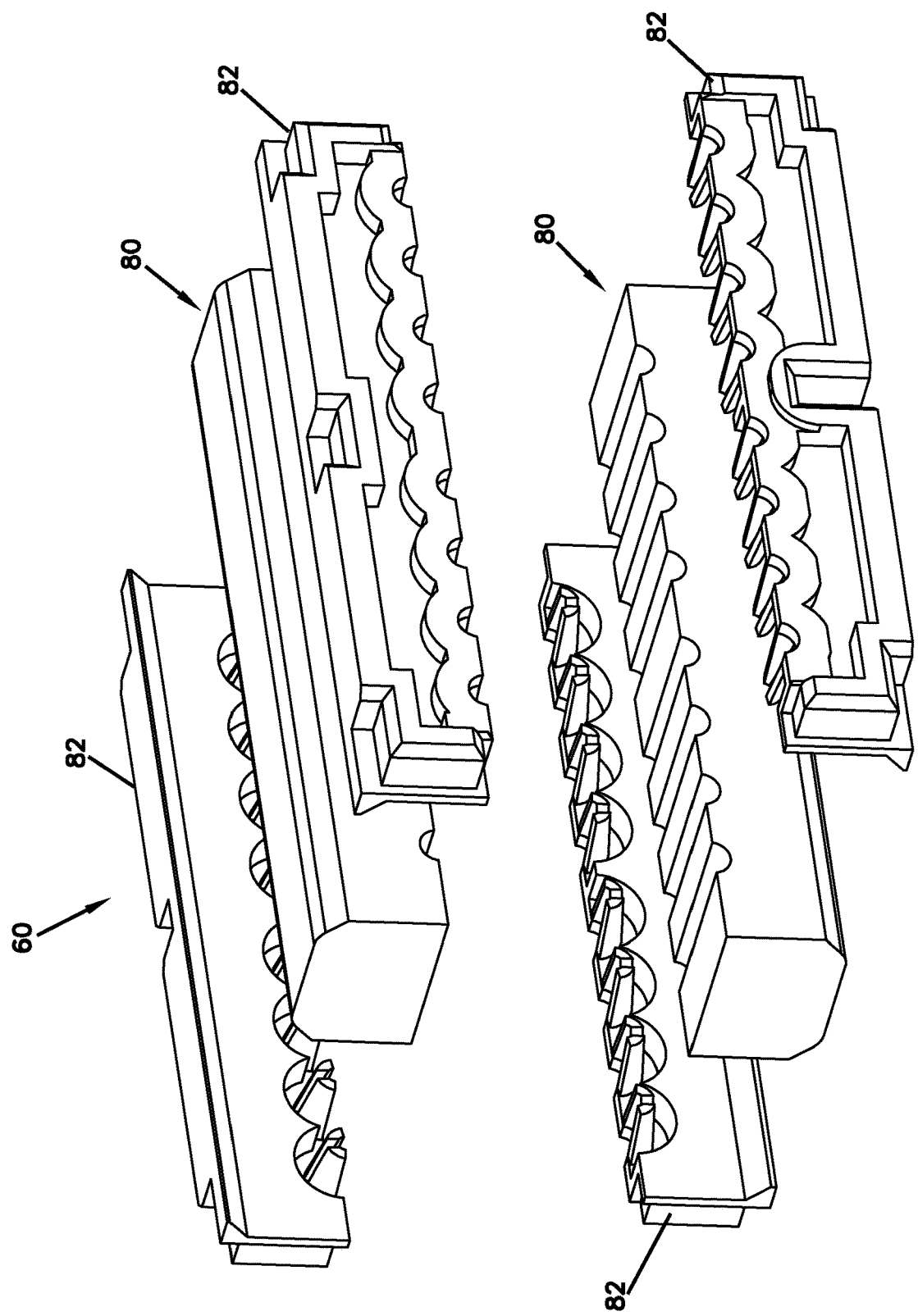
FIG. 11 is an exploded view of the eight-port cable sealing module of FIG. 8.

Referring to FIG. 5, the sealing unit frame 54 defines a plurality of module mounting pockets 66. In one example, the module mounting pockets 66 are rectangular in shape. In certain examples, the module mounting pockets 66 have open sides 68 that face outwardly toward the base 34. In certain examples, the module mounting pockets 66 are defined by walls 70. In certain examples, the module mounting pockets 66 are defined by at least three walls 70. In certain examples, the module mounting pockets 66 are separated from one another by dividers 72 such that the gel sealing modules 60 within each pocket 66 are separate from and non-contiguous with respect to the gel sealing modules 60 mounted in the other pockets 66. In certain examples, each of the module mounting pockets 66 defines a separate module pressurization chamber. In certain examples, the gel modules 60 within the separate module pressurization chambers are simultaneously pressurized by the sealing unit frame 58 when the actuator 62 is actuated.

Referring still to FIG. 5, each of the module mounting pockets 66 defined by the sealing unit frame 58 has a pocket form factor. As depicted at FIG. 5, all of the module mounting pockets 66 have the same pocket form factor. In the example of FIG. 5, the depicted module pocket form factor is rectangular in shape.

Referring still to FIG. 5, the gel sealing modules 60 include modules 60a each defining four round cable ports, modules 60b each defining five round cable ports, modules 60c each defining three round cable ports and modules 60d each defining two elongate cable ports adapted for receiving flat drop cables. Each of the gel sealing modules 60a, 60b, 60c and 60d defines a sealing module form factor compatible with the pocket form factor of the pockets 66. As depicted, the pocket form factor is a multiple of the module form factor defined by the modules 60a, 60b, 60c, and 60d. For example, the pocket form factor is twice the size of the module form factor. In other examples, the pocket form factor may be three times, four times, five times, six times or other multiples of the size of the module form factor. It will be appreciated that as depicted, both the module form factor and the pocket form factor are rectangular. Referring still to FIG. 5, modules 60e and 60f define round cable ports adapted for larger cables. The modules 60e and 60f have form factors that are a multiple of the module form factors of the gel sealing modules 60a, 60b, 60c and 60d. For example, the module form factors of the modules 60e, 60f are two times as large as the module form factors of the modules 60a-60d. In other examples, sealing modules having form factors that are different multiples (e.g., three times, four times, five times, etc.) of the form factor of the gel sealing modules 60a-60d can be used.

FIGS. 6-11 show further views of example gel sealing modules 60. Each of the gel sealing modules 60 includes a sealant such as a volume of gel 80. The volume of gel 80 is positioned between first and second end caps 82. The end caps 82 can also be referred to as end walls or retaining walls or like terms. The end caps 82 function to retain the volume of gel 80 when the sealing modules 60 are pressurized by the cable sealing unit 56. In certain examples, the end caps 82 are formed of a plastic material and are harder than the gel. In certain examples, the end caps 82 are molded plastic. In certain examples, the end caps 82 are bonded to the volume of gel 80. In certain examples, the end caps 82 define cable ports that align with corresponding cable ports defined through the volume of gel 80. In certain examples, the end caps 82 can be configured to engage, interlock with or otherwise contact pressurization structures of the sealing frame unit 58. In this way, when the gel sealing modules 60 are compressed by the sealing unit frame 58, a compression load is applied through the end caps 82 to the volumes of gel 80. In certain examples, the sealing modules 60 each have a multiple piece construction that allow the sealing modules 60 to be opened to insert a cable desired to be sealed therein. Typically, the cable is inserted into the sealing module and placed in one of the cable ports. When the sealing module 60 is pressurized, the gel flows around the cable to fill voids and provides sealing. It is preferred for the sealing module 60 to have multi-piece constructions so as to provide wraparound configurations for allowing cables to be laterally inserted therein. As depicted, each of the sealing modules 60 includes two half pieces. In other examples, more than two pieces can be provided. Additionally, in other examples, the sealing modules can be split at other locations rather than being split in half.

Figure 12:
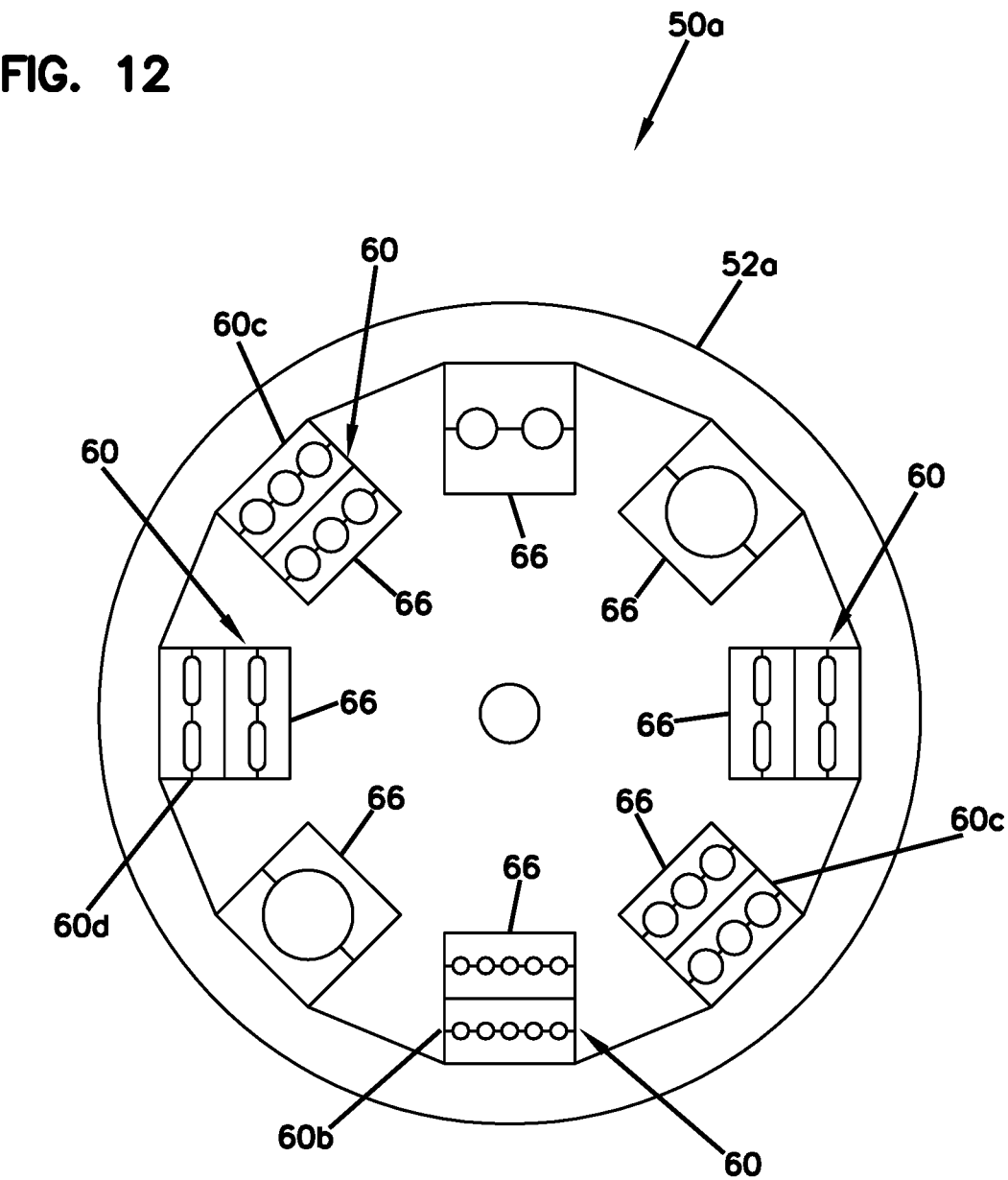
FIG. 12 illustrates another sealing unit in accordance with the principles of the present disclosure, the sealing unit is adapted for use within an enclosure base that is larger than the enclosure base of FIG. 5; the sealing unit defines module pockets having the same module pocket form factor as the module pockets of the sealing unit of FIG. 5.

FIG. 12 shows another enclosure 50a having a round base 52a similar to the base 52. The bases 52 and 52a are both circular. However, the base 52a has a larger diameter than the base 52. The base 52a has more module mounting pockets 66 than the base 52. In this way, the cable sealing unit 56a has a larger capacity than the cable sealing unit 56. However, each of the pockets 66 in both of the cable sealing units 56, 56a have the same pocket form factor. The pocket form factors of the pockets 66 of both of the cable sealing units 56, 56a preferably match the form factors of the gel sealing modules 60a-60d or have a form factor that is a multiple of the module form factor of the gel sealing modules 60a-60d. Thus, the same gel sealing modules 60 are compatible with both the cable sealing unit 56 and the cable sealing unit 56a.

Figure 13:
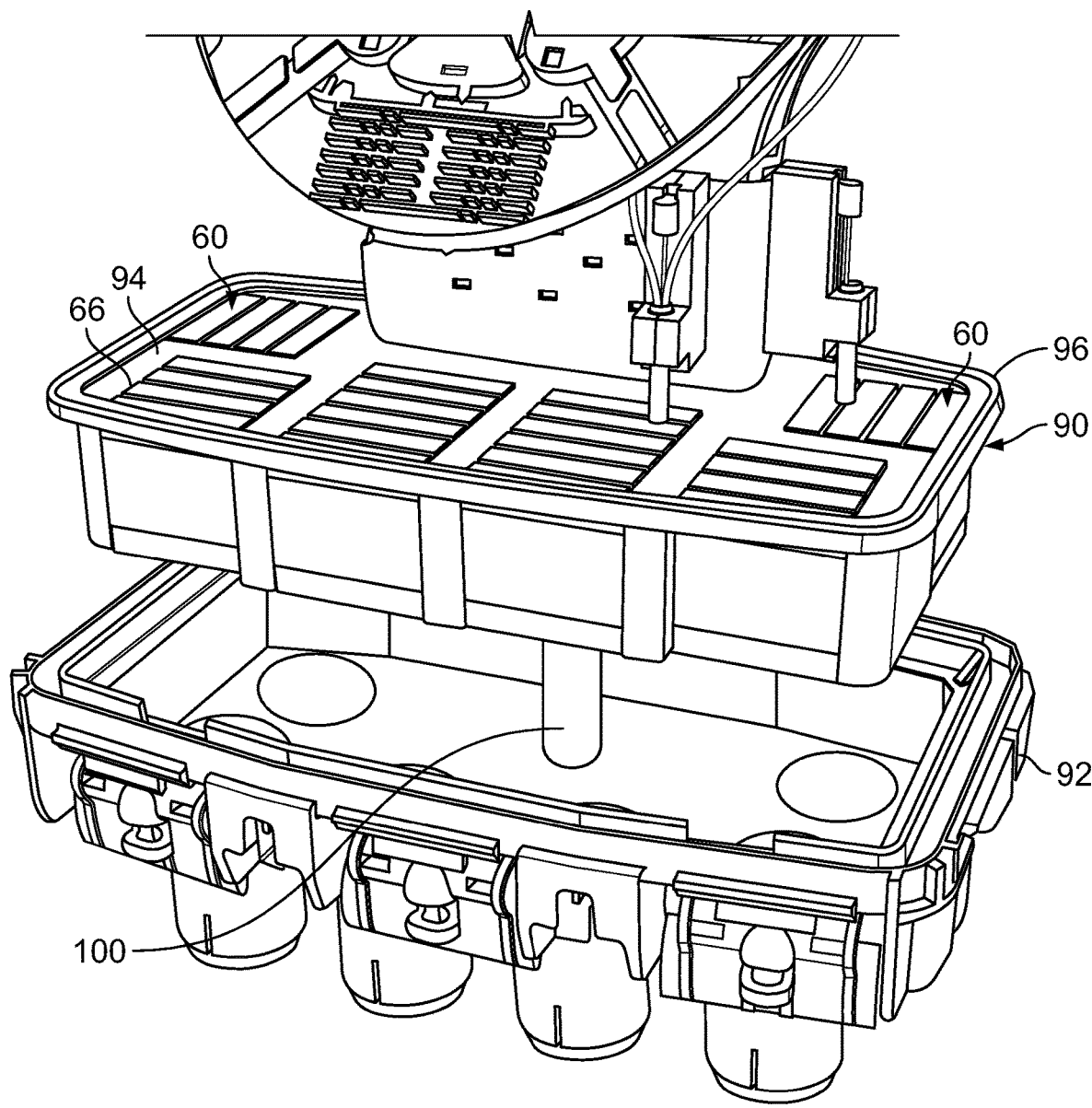
FIG. 13 illustrates another cable sealing unit in accordance with the principles of the present disclosure; the cable sealing unit is adapted for use in an enclosure base having a generally rectangular shape.
Figure 14:
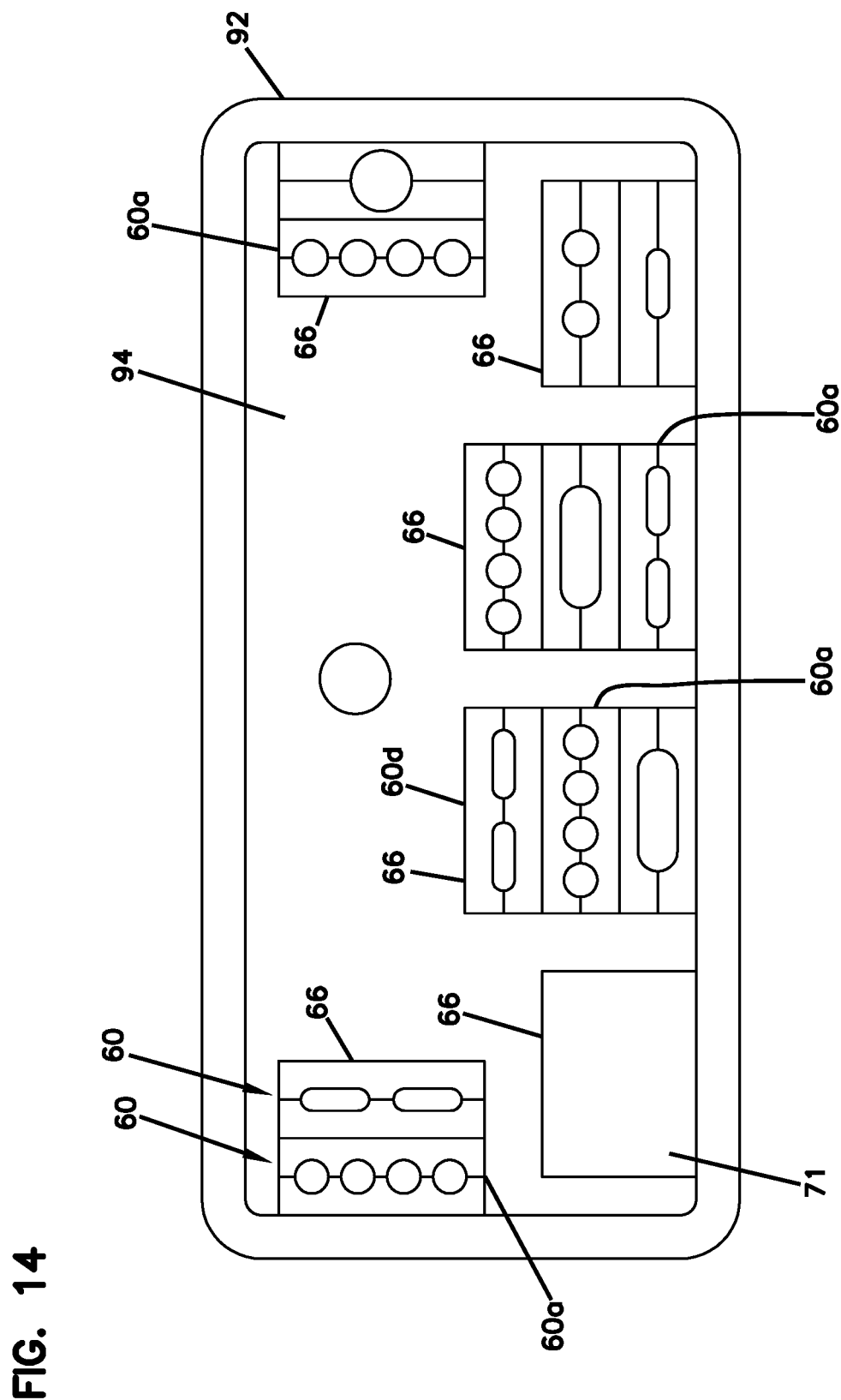
FIG. 14 is a schematic end view showing the sealing unit of FIG. 13 mounted within its corresponding generally rectangular base; the sealing unit defines module pockets having pocket form factors that are compatible with the module form factors of the gel sealing modules used with the sealing units of FIGS. 5 and 12.

FIGS. 13 and 14 show a cable sealing unit 90 that mounts within a generally rectangular base 92 of an enclosure. The cable sealing unit 90 includes a sealing unit frame 94 supporting a perimeter seal 96 that extends along a continuous generally rectangular path. The perimeter seal 96 is a adapted for forming a seal between the sealing unit frame 94 and the rectangular base 92 and can have a construction of the type previously described. The sealing unit frame 94 defines a plurality of the module mounting pockets 66. The module mounting pockets 66 have pocket form factors that are multiples of the module form factors of the modules 60a-60d. For example, four of the pockets 66 are two times as large as the module form factor of the sealing modules 60a-60d, and two of the pockets have a form factor that is three times as large as the module form factor of the sealing modules 60a-60d. As shown at FIG. 14, a gel sealing module in the form of dummy or blank module 71 is mounted within one of the module mounting pockets 66. The cable sealing unit 90 includes an actuator 100 for pressurizing the gel sealing modules within the pockets 66.

Figure 15:
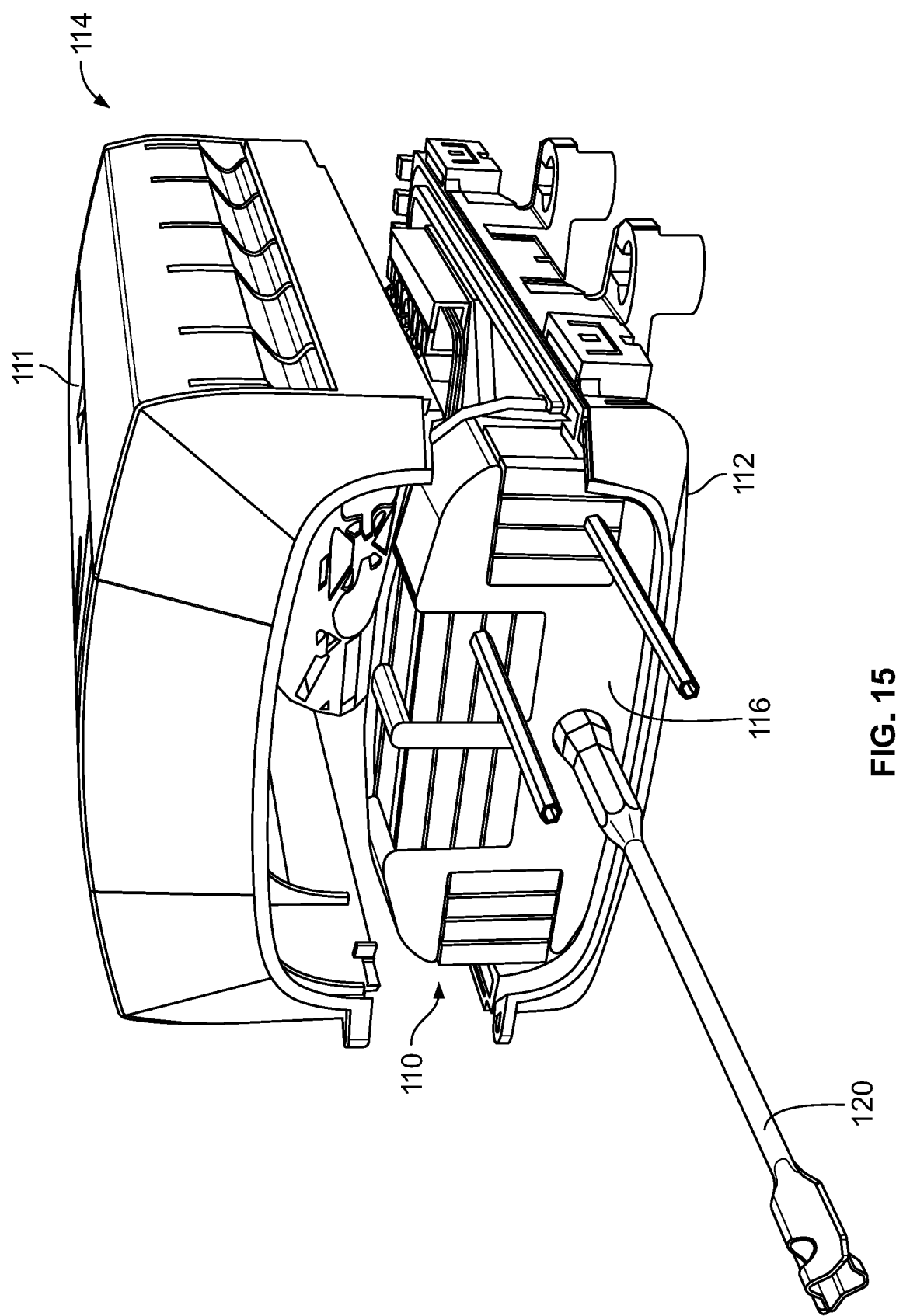
FIG. 15 depicts another sealing unit in accordance with the principles of the present disclosure, the sealing unit is shown mounted at a mounting sealing location defined at an end of a housing of an enclosure, the cable sealing unit is captured between opposing portions of the housing when the opposing portions of the housing are mated together.
Figure 16:
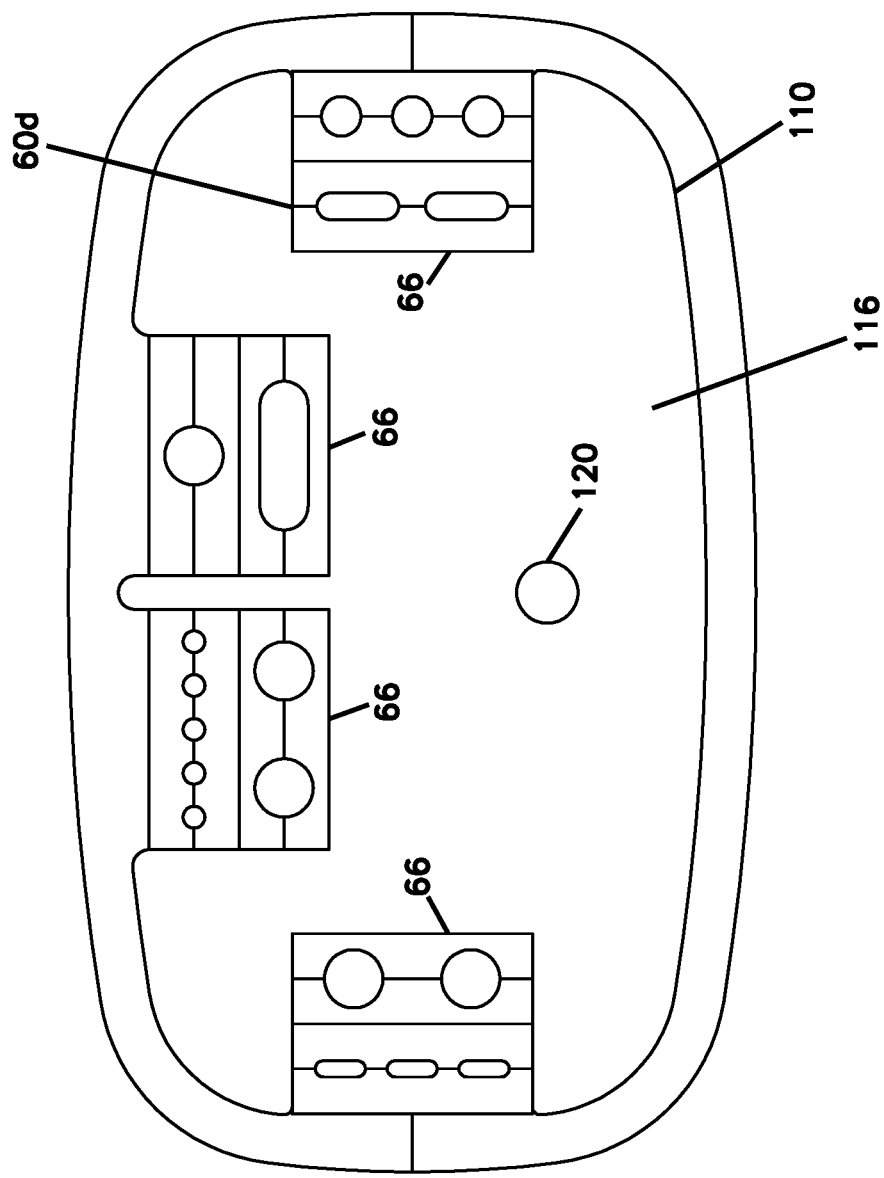
FIG. 16 schematically depicts the cable sealing unit of FIG. 15; mounted at its corresponding mounting location at one end of the enclosure of FIG. 15.

FIGS. 15 and 16 depict another cable sealing unit 110 in accordance with the principles of the present disclosure. The cable sealing unit 110 has a generally rectangular shape and is adapted for being mounted at a mounting location between two housing pieces 111, 112 of an enclosure 114. The cable sealing unit 110 includes a sealing unit frame 116 defining module mounting pockets 66 compatible with the gel sealing modules previously described herein. Thus, it will be appreciated that in one example system the same gel sealing modules 60 disclosed herein can be used with all of the different enclosures disclosed herein. Thus, the various enclosures disclosed herein form a system of enclosures all compatible with gel sealing modules having the same module form factor.

Referring back to FIGS. 15 and 16, the sealing unit frame 116 defines four of the module mounting pockets 66. A perimeter seal 118 is carried with the sealing unit frame 116 and is adapted to form a perimeter seal between the sealing unit frame 116 and an interior of the housing when the housing pieces 111, 112 are mated together. The cable sealing unit 110 includes an actuator 120 that interfaces with the sealing unit frame 116 to allow the gel sealing modules to be simultaneously pressurized within their corresponding module mounting pockets 66.

While the various cable sealing modules are shown including pre-defined ports defined through the gel, in other examples, particularly for smaller cables, the ports may not be pre-defined. Instead, ports can be defined by deformation of the gel around cables inserted therein.

Figure 17:
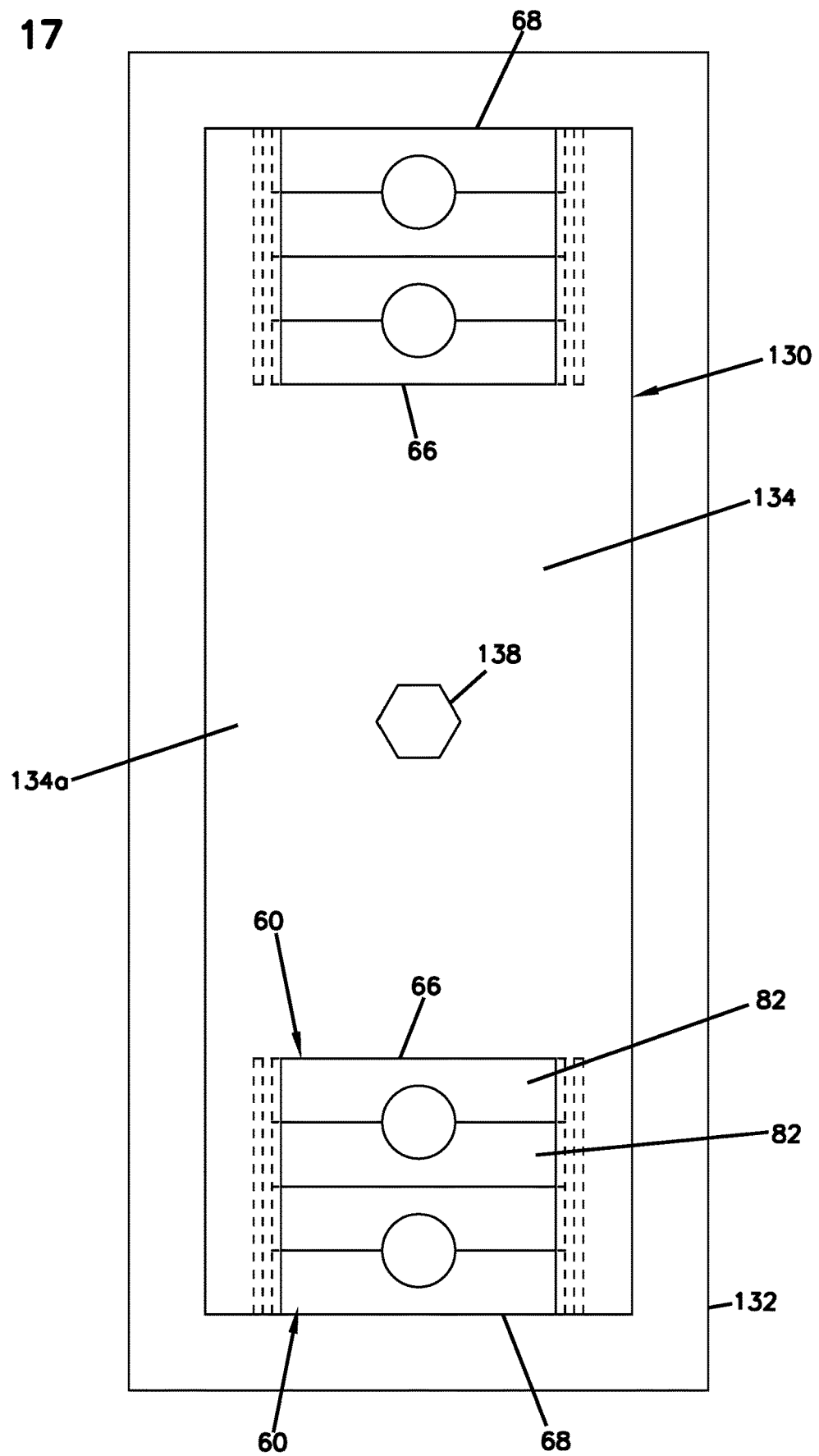
FIG. 17 is an end view of another sealing unit in accordance with the principles of the present disclosure.
Figure 18:
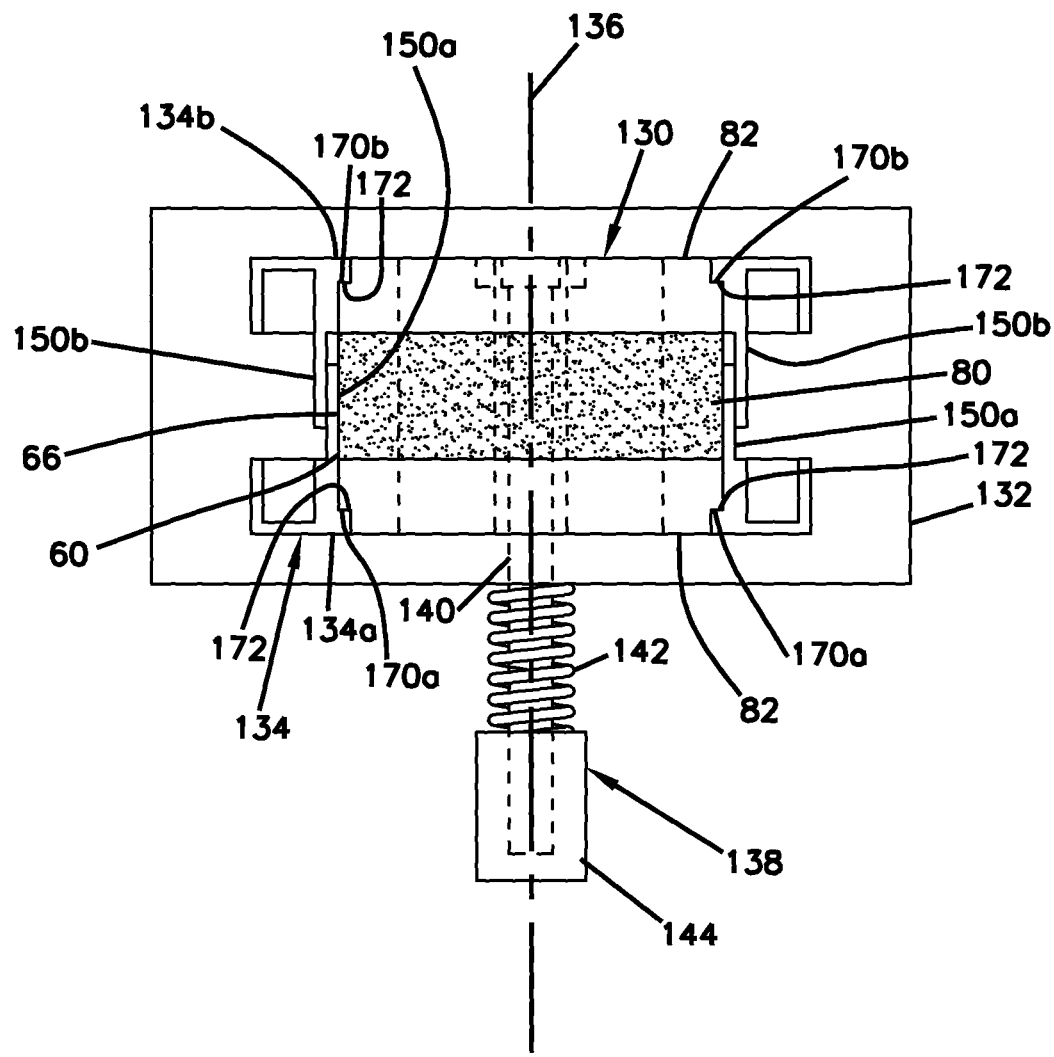
FIG. 18 is a side view of the sealing unit of FIG. 17.

FIGS. 17 and 18 show another example cable sealing unit 130 in accordance with the principles of the present disclosure. The cable sealing unit 130 is shown mounted within a portion of a housing such as in a base 132. The cable sealing unit 130 includes a sealing unit frame 134 defining module mounting pockets 66. Gel sealing modules 60 are shown mounted within the module mounting pockets 66. The pockets 66 have open sides 68 that oppose the interior of the base 132. The sealing unit frame 134 includes first and second pressurization structures 134a, 134b. At least one of the pressurization structures 134a, 134b is movable relative to the other of the pressurization structures 134a, 134b along an axis 136 when an actuator 138 of the cable sealing unit 130 is actuated. As depicted, the actuator 138 includes a shaft 140 coupled to the second pressurization structure 134b that extends through the first pressurization structure 130a. A spring 142 is mounted on the shaft 140. A handle 144 is threaded on the shaft 140. By threading the handle 144 on the shaft 140, the spring 142 can be biased against the first pressurization structure 134a causing the first and second pressurization structures 134a, 134b to be pressed together via spring load causing the simultaneous pressurization of the gel sealing modules 60. The first and second pressurization structures 134a, 134b can include walls 150 that cooperate to define the mounting pockets 66 for containing the modules 60. Thus, the walls 150 cooperate to define separate pressurization chambers. In certain examples, the walls 150a, 150b can telescope relative to one another when the pressurization structures 134a, 134b are driven by the actuator 138 along the axis 136. In certain examples, the end caps 82 of the sealing modules 60 can interface with the pressurization structures 134a, 134b so as to facilitate the transfer of spring load from the pressurization structures 134a, 134b to the gel 80. As depicted, the pressurization structures 134a, 134b include rails or lips 170a, 170b, opposed corresponding shoulders 172 of the end caps 82 such that the end caps 82 and their corresponding modules 60 are captured between the pressurization structures 134a, 134b.

It will be appreciated that various materials can be used to form the sealant arrangement or gel within the gel sealing modules. Example materials include elastomers, including natural or synthetic rubbers (e.g., EPDM rubber or silicone rubber). In other embodiments, polymeric foam (e.g., open cell or closed cell) such as silicone foam can be used. In still other embodiments, the sealing members may comprise gel and/or gel combined with another material such as an elastomer. The gel may, for example, comprise silicone gel, urea gel, urethane gel, thermoplastic gel, or any suitable gel or geloid sealing material. Gels are normally substantially incompressible when placed under a compressive force and normally flow and conform to their surroundings thereby forming sealed contact with other surfaces. Example gels include oil-extended polymers. The polymer may, for example, comprise an elastomer, or a block copolymer having relatively hard blocks and relatively elastomeric blocks. Example copolymers include styrene-butadiene or styrene-isoprene di-block or tri-block copolymers. In still other embodiments, the polymer of the gel may include one or more styrene-ethylene-propylene-styrene block copolymers. Example extender oils used in example gels may, for example, be hydrocarbon oils (e.g., paraffinic or naphthenic oils or polypropene oils, or mixtures thereof). The sealing members can also include additives such as moisture scavengers, antioxidants, tackifiers, pigments and/or fungicides. In certain embodiments, sealing members in accordance with the principles of the present disclosure have ultimate elongations greater than 100 percent with substantially elastic deformation to an elongation of at least 100 percent. In other embodiments, sealing members in accordance with the principles of the present disclosure have ultimate elongations of at least 200 percent, or at least 500 percent, or at least 1000 percent. Ultimate elongation can be determined by the testing protocol set forth at ASTM D412. In one example, the gel has a hardness in the range of 24-53 Shore 000.

From the forgoing detailed description, it will be evident that modifications and variations can be made without departing from the spirit and scope of the disclosure.

What is claimed is:

1. A sealing unit for use with a telecommunications enclosure, the sealing unit comprising:
   a sealing unit frame defining a pocket; and
   a pair of gel members mounted within the pocket and having gel faces perpendicular to a longitudinal axis of a cable when the cable is inserted between the pair of gel members and sealed by the gel members, the gel faces continuously abutting each other along an entire dimension of one of the gel faces when the cable is not inserted between the pair of gel members, the pair of gel members being configured such that a cable port for the cable is defined by deformation of gel of each of the gel members around the cable when the cable is inserted between the pair of sealing modules.

2. The sealing unit of claim 1, further comprising an actuator for pressurizing the gel members within the sealing unit frame.

3. The sealing unit of 1, wherein the sealing unit frame includes first and second pressurization structures that are moveable relative to one another, the gel members being pressurized between the first and second pressurization structures.

4. The sealing unit of 1, wherein each gel member is a component of a sealing module, the sealing module including a volume of the gel bonded between first and second end caps.

5. The sealing unit of claim 1, further comprising a perimeter seal for sealing an exterior of the sealing unit frame,
   wherein the perimeter seal includes a different type of sealing material compared to the gel of the sealing modules; and
   wherein the perimeter seal is not contiguous with the gel of the gel members.

6. The sealing unit of claim 5, wherein the perimeter seal is an elastomeric gasket.

\* \* \* \* \*